United States Patent [19]

Parrone

[11] Patent Number: 4,735,528
[45] Date of Patent: Apr. 5, 1988

[54] SPOT WELD REMOVING TOOL

[76] Inventor: Tony Parrone, 3604-67th St., Kenosha, Wis. 53140

[21] Appl. No.: 35,389

[22] Filed: Apr. 7, 1987

[51] Int. Cl.⁴ ............................................. B23B 41/00
[52] U.S. Cl. ...................... 408/86; 408/112; 408/202
[58] Field of Search ............ 408/14, 15, 85, 86, 408/100, 112, 113, 202, 241 S

[56] References Cited

U.S. PATENT DOCUMENTS

| | | | |
|---|---|---|---|
| 1,212,634 | 1/1917 | Hathaway | 82/1.3 |
| 1,389,390 | 8/1921 | Sparkling | 408/202 |
| 2,905,030 | 9/1959 | Cogsdill | 408/112 |
| 3,320,832 | 5/1967 | Jensen | 408/202 |
| 4,012,161 | 3/1977 | Shultz | 408/112 |
| 4,115,017 | 9/1978 | Wilhelmsson | 408/202 |
| 4,540,319 | 9/1985 | Michiharu | 408/202 |

FOREIGN PATENT DOCUMENTS 670392  6/1979  U.S.S.R. .............................. 408/14

*Primary Examiner*—Gil Weidenfeld
*Assistant Examiner*—Daniel W. Howell
*Attorney, Agent, or Firm*—Peter N. Jansson, Ltd.

[57] ABSTRACT

An improved bit-like device for proper removal of spot weld interconnections of upper and lower flat members, such as in sheet metal operations. The device includes an outer member sleeved over a bit shank, rotational and slidable connection structure between the outer member and the shank, a spring biasing the outer member to a non-work position, and stop members, preferably adjustable, to limit the relative axial movement of the outer member with respect to the shank and thereby limit the depth of metal removal.

19 Claims, 1 Drawing Sheet

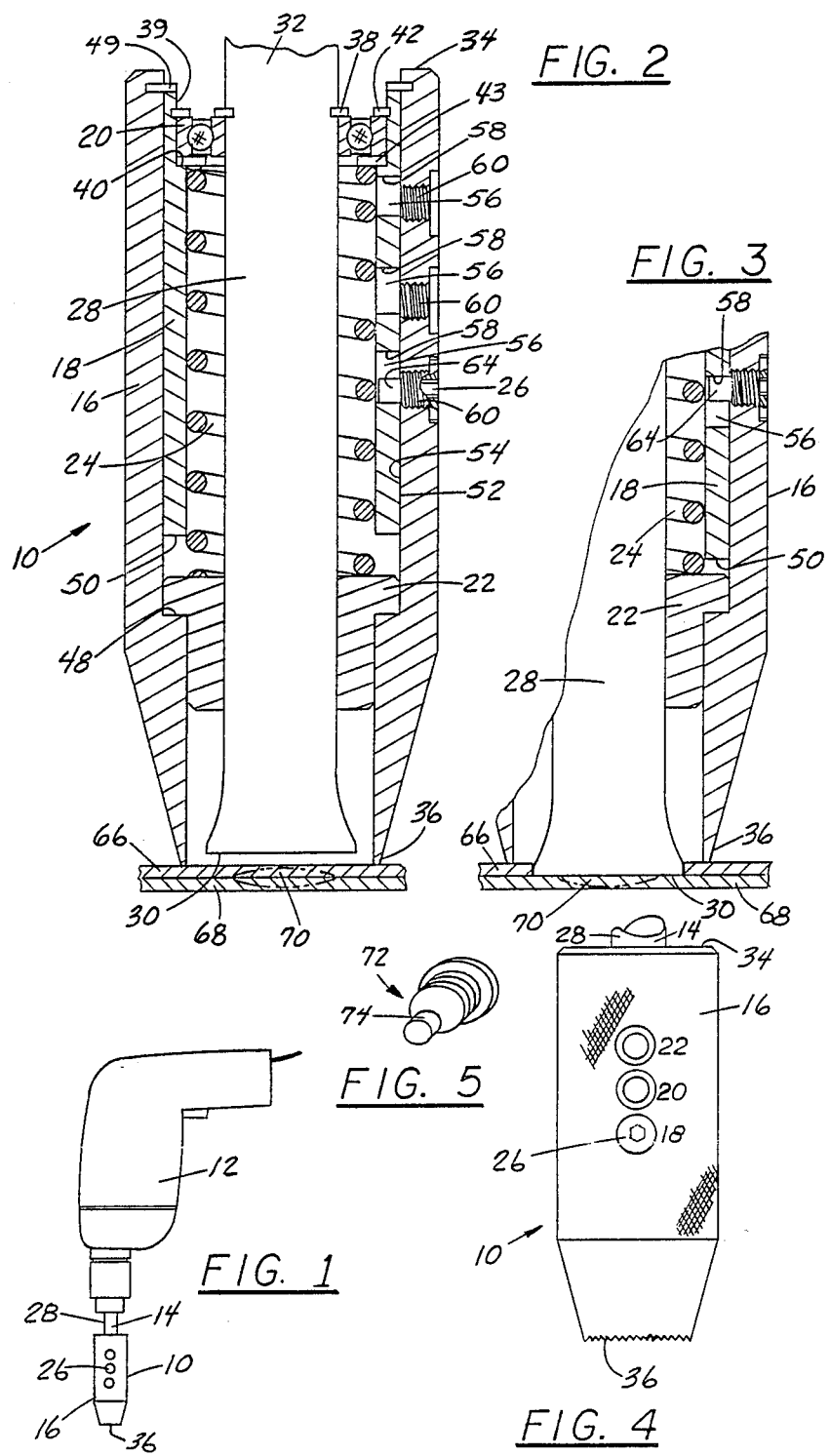

SPOT WELD REMOVING TOOL

FIELD OF THE INVENTION

This invention is related generally to devices for removal of surface metal such as spot welded portions in sheet metal working operations and, more particularly, to devices such as spot weld removers of the type with metal-removing bits having shanks attachable to hand-held rotary drives.

BACKGROUND OF THE INVENTION

This invention is best described with reference to spot weld removal operations. The task of removing spot weld interconnections of upper and lower flat members is typically very time-consuming and difficult. Spot weld removing operations are regularly and frequently practiced in a variety of situations, most notably in vehicle panel replacement in auto body shops.

In removing a spot weld interconnection of upper and lower flat members, which are typically metal plates, it is usually highly desirable to remove the metal of the upper flat member at the location of a spot weld interconnection without removing any of the metal below the interface of the upper and lower flat members. Invasion of metal coincident with the lower flat member is undesirable. Removal of upper member metal alone is sufficient to disconnect the flat members, provided the metal removal is at the weld location.

Extremely careful tool manipulation and use is necessary to achieve removal of the upper flat member without invading the lower flat member. It is this which makes the operation difficult and time-consuming.

A variety of tools are used for spot weld removal. Bits of various kinds are frequently used, including drills, burr drills, end mills, and the like. Some of such bits have a working end which is substantially normal to the bit axis. This facilitates spot weld removal without invasion of the lower flat member, but the operation is still difficult and time-consuming.

Among other things, it is often difficult to control the depth of tool movement into the interconnected flat members. The lower flat member is usually invaded unless extreme care is taken in the operation. The operator often is required to guess the thickness (gauge) of the upper member, and even then is unable to properly limit the metal removal to metal above the interface.

And, with certain bit-like spot weld removing devices of the prior art, accurate placement of the tool over the spot weld portion is difficult. Furthermore, holding the tool at that portion during the spot weld removing operation, particularly at the beginning of the operation, is difficult.

Specialized tools have been developed to aid in removal of spot welded portions in sheet metal work. Among these are tools having annular cutting edges to cut an annular groove around a spot weld interconnection and a spring-loaded center guide pin to hold the tool in place during cutting of the annular groove. Another example is the specialized tool disclosed in U.S. Pat. No. 4,540,319 (Michiharu), which is a complex drilling device with apparatus to control the extent of the axial movement of a chuck having a drill mounted in it. Still other devices, to which bits may be secured, control the extent of axial movement by a bit for various purposes.

While such prior devices address some of the problems associated with removal of spot weld interconnections, there is a need for an improved spot weld removing device, of the type having a metal-removing bit directly attachable to a hand-held rotary drive, which will quickly, easily and accurately remove the spot weld portion of an upper flat member without invasion of the lower flat member. A tool allowing easy and more accurate placement on the proper spot is needed. A tool which may readily be adjusted to accommodate different thicknesses of the upper flat members to be removed is needed.

In summary, the devices of the prior art have not provided a simple, easily understood, easily usable and accurate spot weld portion removing device.

OBJECTS OF THE INVENTION

It is an object of this invention to provide an improved device for removing spot weld portions overcoming some problems and shortcomings of the prior art, including those mentioned.

Another object of this invention is to provide an improved spot weld removing device which quickly and accurately removes the spot weld portion of an upper flat member without invading the lower flat member.

Another object of this invention is to provide an improved spot weld removing device which may be quickly and easily placed and held at the right location for proper spot weld removal.

Another object of this invention is to provide an improved spot weld remover which is simple in structure and use, having a metal-removing bit directly attachable to a rotary drive.

Another object of this invention is to provide an improved spot weld removing device which is readily adjustable to remove upper flat members of various thicknesses.

These and other important objects will be apparent from the descriptions of this invention which follow.

SUMMARY OF THE INVENTION

This invention is an improved device for accurate removal of surface metal and the like, such as for removing spot weld interconnections of upper and lower flat members as in auto body sheet metal operations or for surface grooving. It includes a bit with a working end and a shank attachable at its opposite end directly to a rotary drive and, among other things, improved means to control the depth of movement of the working end.

One element of the invention is an outer member sleeved over the shank. The outer member extends from a proximal end, axially spaced from the end of the shank attachable to the rotary drive, to a distal end near the working end of the bit. The outer member is axially movable with respect to the shank between a first position in which the distal end is beyond the working end and a second position in which the working end is beyond the distal end. Before metal removal commences the outer member is in the first relative axial position. After the bit has been moved within the outer member such that the outer member has reached the second relative axial position, the axial metal removing movement of the bit is stopped.

Connecting means, in various forms, rotationally and slidably join the outer member to the shank. A spring means biases the outer member to the first position. A limiting means, which serves to limit the relative axial movement of the outer member with respect to the shank, extends radially from the outer member to set the aforementioned second position.

Spot weld interconnections can quickly and accurately be removed using the device of this invention, while preserving the lower member from invasion by the tool.

In preferred embodiments, the bit has a working end which is substantially normal to the axis of the bit. Most preferably, the bit is flared outwardly to a greater tip diameter at its working end. In such preferred embodiments, the outer member is preferably tapered inwardly to a reduced outside diameter at its distal end. The outward flaring of the bit and inward tapering of the outer member allow the outside diameter of the outer member to approach the tip diameter. This improved combination of characteristics aids in accurate placement of the tool over a spot weld to be removed.

In certain preferred embodiments, the biasing means is a coil spring held in compression. The connecting means which rotationally and slidably joins the outer member to the shank preferably includes a pair of axially spaced annular rotational bearings which are around the shank and have outer portions non-rotational with respect to the outer member. This allows the bit to rotate freely while the outer member is rotationally fixed. At least one bearing is preferably a ball bearing.

One of the bearings is preferably axially fixed with respect to the shank and the other bearing is axially fixed with respect to the outer member. The biasing means is preferably a coil spring in compression having its opposite ends each in an axially fixed position with respect to one of the two bearings, most preferably each directly against one of the two bearings.

In certain highly preferred embodiments, the connecting means includes an inner member which is non-rotationally and slidably sleeved within the outer member and axially fixed with respect to the shank. Such inner member provides a slide bearing for the outer member. In such embodiments, the connecting means preferably also includes a pair of axially spaced annular rotational bearings around the shank as described, having outer portions which are non-rotational with respect to the inner and outer members. The biasing means preferably is a coil spring between the shank and the inner member, most preferably against the inside of the inner member.

The limiting means, which limits the relative axial movement of the outer member with respect to the shank, preferably includes a first stop means on the connecting means in axially fixed position with respect to the shank and a second stop means extending radially inwardly from the outer member to a position for interference with the first stop means.

The limiting means is preferably adjustable such that the user can choose an appropriate second position to accommodate the thickness of the upper flat member. That is, the user can set the depth of possible movement of the working end such that it will remove material of the upper flat member without removing any material of the lower flat member. More specifically, at least one of the first and second stop means is adjustable to allow a choice of different second positions.

In certain highly preferred embodiments with the inner member described above, the limiting means includes a plurality of stop edges formed in the inner member, a corresponding plurality of stop member mounts formed in the outer member, and a stop member which is selectively secured to one of the stop member mounts such that it extends radially inwardly from the outer member to a position for interference with the corresponding stop edge. This allows the device to be preset readily for removal of upper member material for an upper member of known standard thickness.

A preferred stop member is a screw and the stop member mounts are preferably threaded openings which can receive the screw. A single screw may be placed in a selected threaded opening, or screws may be in each opening with all but one in retracted positions of non-interference. The stop edges formed in the inner member are preferably the ends of slots which are sized to receive a screw or other stop member extending through the corresponding stop member mounts. The axial locations of such slots, particularly the slot ends, and the axial locations of the stop member mounts and the dimensions of the stop member mount itself are all chosen to set appropriate second positions to match a standard thickness of the upper flat members to be removed in a spot weld removing operation.

Various other adjustment devices may be used.

BRIEF DESCRIPTION OF THE DRAWINGS

FIG. 1 is a side elevation of a preferred spot weld interconnection removing device of this invention, shown with its shank attached to a hand-held rotary drive.

FIG. 2 is an enlarged side sectional view of the spot weld removing device of FIG. 1, shown with the distal end of the outer member beyond the working end of the bit, that is, in the aforementioned first position.

FIG. 3 is a partially cut-away similar side sectional view, but illustrating the device with the outer member in its second position, in which the working end of the bit is beyond the distal end of the outer member.

FIG. 4 is an enlarged front elevation of the spot weld removing device of FIG. 1.

FIG. 5 is a perspective view of a stop member used in an alternate embodiment, allowing fine variation in cutting depth.

DETAILED DESCRIPTIONS OF PREFERRED EMBODIMENTS

The figures illustrate a spot weld removing device 10 which is a preferred embodiment of this invention. Spot weld removing device 10, when in use, is attached to a rotary drive unit 12, as shown in FIG. 1. In using the invention, the drive unit is held in one hand and spot weld removing device 10 is held by its outer portion in the other. Spot weld removing device 10 includes a bit 14, an outer member 16, an inner member 18, a first bearing 20, a second bearing 22, a coil spring 24 and a screw 26 which serves as part of an adjustable stop member.

Bit 14 is a straight, generally cylindrical member having a shank 28, a working end 30 and an opposite end 32 by which it, and spot weld removing device 10, are attached to rotary drive unit 12. Working end 30 is substantially normal to the axis of bit 14, but has surface and/or edge characteristics (not shown) allowing cutting of the metal by the rotary action of bit 14 and pressure applied to the work through it. The surface of working end 30 may have cutting edges of various sizes and designs. Different surface characteristics can be chosen to accommodate the different qualities of the workpiece, which, for example, may have varying degrees of hardness.

Outer member 16 is sleeved over bit 14. Outer member 16 extends from a proximal end 34 which is spaced from opposite end 32 to a distal end 36 which is near working end 30 of bit 14. Outer member 16 is rotationally and slidably joined to shank 28 by means of various elements between shank 28 and outer member 16, including first and second bearings 20 and 22 and inner member 18 as hereafter described in greater detail.

Bit 14 is flared outwardly to a greater diameter, referred to as the tip diameter, at working end 30. Outer member 16 is tapered inwardly to a reduced outside diameter at distal end 36. Thus, the reduced diameter of outer member 16 approaches the tip diameter of bit 14. This aids significantly in making an accurate placement of device 10 over a spot weld to be removed. As shown in FIG. 4, distal end 36 has a fine serration along its edge. This helps hold spot weld removing device 10 in the proper location as the spot weld removing operation begins.

First bearing 20, which is a ball bearing, extends around shank 28 and is held in axial position by a snap ring 38 which is held in a groove formed in shank 28. Inner member 18 has, near its upper edge 39, an inwardly facing annular ledge 40 which is dimensioned to receive the outer diameter of first bearing 20. An inwardly extending snap ring 42, mounted within a groove in inner member 18, is positioned to hold first bearing 20 against a washer 43 which is itself against annular ledge 40. Thus, shank 28, first bearing 20 and inner member 18 all remain in fixed relative axial positions. Shank 28, however, is free to rotate with respect to inner member 18 by virtue of first bearing 20.

Second bearing 22 is a flange-type bearing, preferably made of acetal, Teflon-filled acetal, or nylon. Bearing 22 extends around shank 28, and is in slidable and rotational engagement with shank 28. The outer portion of bearing 22 is held against an inwardly extending annular ledge 48 on the inside surface of outer member 16. Bearing 22 is non-rotatably engaged with outer member 16 as bit 14 rotates within it Coil spring 24 is concentrically located between shank 28 and inner member 18. Coil spring 24 is dimensioned to engage the inner surface of inner member 18 and be radially spaced to some extent from shank 28. Coil spring 24 is held in compression between first and second bearings 20 and 22, and helps to hold second bearing 22 against annular ledge 48. More importantly, spring 24 biases outer member 16 to a first position in which distal end 36 of outer member 16 is beyond bit working end 30. The opposite ends of coil spring 24 are flattened to facilitate their engagement with bearings 20 and 22.

Extending radially inwardly from the inside surface of outer member 16 is a snap ring 49 which is engaged in a groove in outer member 16 near its proximal end 34. Snap ring 49 is positioned to engage upper edge 39 of inner member 18. Snap ring 49 thereby limits the relative axial movement of outer member 16 with respect to inner member 18 and bit 14 which occurs under the biasing force of coil spring 24.

Outer member 16 is axially movable with respect to shank 28 against the compression force of spring 24. Such relative axial movement is from the aforementioned first position to a second position in which working end 30 of bit 14 is beyond distal end 36 of outer member 16. The first position is shown in FIG. 2 and the second position is shown in FIG. 3.

In use, such relative axial movement occurs as drilling pressure is applied to bit 14, through hand-held drive unit 12, causing bit 14 to move while outer member 16 is itself in fixed position with respect to the work.

Inner member 18 has an outside surface 52 which is in sliding engagement with an inside surface 54 of outer member 16. Surfaces 52 and 54 are preferably machined to allow good sliding engagement. Inner member 18 has a lower edge 50 which is spaced from second bearing 22 sufficiently to accommodate the relative axial motion just described.

The relative axial movement of outer member 16 and bit 14, against the biasing force of spring 24, is stopped at a second position, as already indicated. Such second position is set by limiting means extending radially from outer member 16 to engage a cooperating stop edge on inner member 18.

Inner member 18 has three slots 56 the upper ends of which form stop edges 58. The three slots 56 have differing vertical dimensions to allow different lengths of axial movement of outer member 16 with respect to inner member 18 and bit 14. For each slot 56 there is a corresponding threaded opening 60 in outer member 16, positioned adjacent to its corresponding slot 56. Each threaded opening 60 forms a stop member mount.

Screw member 26 is selectively engaged in one of the threaded openings 60. Screw member 26 has an end 64 which, when screw member 26 is fully engaged with a threaded opening, extends into its corresponding slot 56. Relative axial movement of outer member 16 and bit 14 against the biasing force of spring 24 is stopped when screw end 64 engages the stop edge 58 of such slot.

As noted above, the axial locations of slots 56, their stop edges 58, and threaded openings 60, and the dimensions of screw 26 and its end 64, are all chosen to set appropriate second positions to match standard thicknesses of upper flat members to be removed in a spot weld removing operation.

In order to adjust the device for an upper flat member of another standard thickness, screw 26 is removed and inserted in the appropriate other threaded opening. In the embodiment illustrated, screw 26 is adapted for turning by an Allen wrench.

FIG. 5 shows a screw 72 which is an alternate form of a stop member. Screw 72 has an eccentric end 74 which limits the relative axial movement by different amounts, depending on its rotational position.

FIGS. 2 and 3, as noted above, show spot weld removing device 10 in the first and second operational positions, respectively. In FIG. 2, distal edge 36 is applied against the surface of upper flat member 66 and working end 30 of bit 14 has not yet contacted either upper flat member 66 or the lower flat member 68. Flat members 66 and 68 are shown in section in FIGS. 2 and 3, as is interconnecting spot weld 70. In FIG. 3, working end 30 has moved into and completely through upper flat member 66. But, because of the engagement of screw end 64 with stop edge 58, working end 30 does not pass the interface of flat members 66 and 68.

Spot weld removing device 10 may be made using readily available materials and parts. Appropriate choices would be apparent to those skilled in the art who are made familiar with this invention.

While the principles of this invention have been described in connection with specific embodiments, it should be understood clearly that these descriptions are made only by way of example and are not intended to limit the scope of the invention.

What is claimed:

1. In a device for removing spot weld interconnections of upper and lower flat members of the type including a bit, with a working end and a shank attachable at an opposite end to a roatary drive, and means to control the depth of movement of the working end, the improvement comprising:

an outer member sleeved over the shank and extending from a proximal end spaced from the shank opposite end to a distal end, the outer member axially movable with respect to the shank between a first position in which the distal end is beyond the working end and a second position in which the working end is beyond the distal end;

connecting means rotationally and slidably joining the outer member to the shank, said connecting means located axially between the proximal and distal ends of the outer member and being radially inside of the outer member such that the outer member substantially covers the connecting means;

means biasing the outer member to the first position; and means limiting the relative axial movement of the outer member extending radially from the outer member to set the second position, whereby spot weld interconnections can quickly and accurately be removed while preserving the lower member.

2. The spot weld removing device of claim 1 wherein the working end of the bit is substantially normal to the axis of the bit.

3. The spot weld removing device of claim 2 wherein the bit is flared outwardly to a greater tip diameter at the working end.

4. The spot weld removing device of claim 3 wherein the outer member is tapered inwardly to a reduced outside diameter at the distal end, whereby the outside diameter approaches the tip diameter to aid in accurate placement of the tool over a spot weld to be removed.

5. The spot weld removing device of claim 1 wherein the biasing means is a coil spring in compression.

6. The spot weld removing device of claim 1 wherein the connecting means includes a pair of axially spaced annular rotational bearings around the shank and having outer portions which are non-rotational with respect to the outer member, whereby the bit may rotate freely while the outer member is rotationally fixed.

7. The spot weld removing device of claim 1 wherein the limiting means comprises:

a first stop means on the connecting means in axially fixed position with respect to the shank; and a second stop means extending radially inwardly from the outer member to a position for interference with the first stop means.

8. The spot weld removing device of claim 7 wherein at least one of the stop means is adjustable to allow a choice of different second positions.

9. The spot weld removing device of claim 7 wherein at least one of the stop means has means for infinite variability in the second positions.

10. In a device for removing spot weld interconnections of upper and lower flat members of the type including a bit, with a working end and a shank attachable at an opposite end to a rotary drive, and means to control the depth of movement of the working end, the improvement comprising:

an outer member sleeved over the shank and extending from a proximal end spaced from the shank opposite end to a distal end, the outer member axially movable with respect to the shank between a first position in which the distal end is beyond the working end and a second position in which the working end is beyond the distal end;

connecting means rotationally and slidably joining the outer member to the shank, the connecting means including a pair of axially spaced annular rotational bearings around the shank and having outer portions which are non-rotational with respect to the outer member, one of the bearings axially fixed with respect to the shank and the other bearing axially fixed with respect to the outer member;

means biasing the outer member to the first position; and means limiting the relative axial movement of the outer member extending radially from the outer member to set the second position, whereby spot weld interconnections can quickly and accurately be removed while preserving the lower member.

11. The spot weld removing device of claim 10 wherein the biasing means is a coil spring in compression having its opposite ends each in an axially fixed position with respect to one of the two bearings.

12. The spot weld removing device of claim 11 wherein the opposite ends of the coil spring are against the two bearings.

13. In a device for removing spot weld interconnections of upper and lower flat members of the type including a bit, with a working end and a shank attachable at an opposite end to a rotary drive, and means to control the depth of movement of the working end, the improvement comprising:

an outer member sleeved over the shank and extending from a proximal end spaced from the shank opposite end to a distal end, the outer member axially movable with respect to the shank between a first position in which the distal end is beyond the working end and a second position in which the working end is beyond the distal end;

connecting means rotationally and slidably joining the outer member to the shank, said connecting means including an inner member non-rotationally and slidably sleeved within the outer member and axially fixed with respect to the shank, said inner member providing a slide bearing for the outer member;

means biasing the outer member to the first position; and means limiting the relative axial movement of the outer member extending radially from the outer member to set the second position, whereby spot weld interconnections can quickly and accurately be removed while preserving the lower member.

14. The spot weld removing device of claim 13 wherein the connecting means further includes a pair of axially spaced annular rotational bearings around the shank and having outer portions which are non-rotational with respect to the inner and outer members, whereby the bit may rotate freely while the inner and outer member are rotationally fixed.

15. The spot weld removing device of claim 14 wherein the rotational bearings include a ball bearing.

16. The spot weld removing device of claim 14 wherein:
- one of the bearings is axially fixed with respect to the shank;
- the other bearing is axially fixed with respect to the outer member; and
- the biasing means is a coil spring between the shank and the inner member, the spring being in compression with its opposite ends each in an axially fixed position with respect to one of the two bearings.

17. The spot weld removing device of claim 13 wherein the limiting means comprises:
- a plurality of stop edges formed in the inner member;
- a corresponding plurality of stop member mounts formed in the outer member; and
- a stop member selectively secured to one of the stop member mounts such that it extends radially inwardly from the outer member to a position for interference with the corresponding stop edge, whereby the device readily can be set for removal of upper member material for an upper member of known thickness.

18. The spot weld removing device of claim 17 wherein the stop member is a screw and the stop member mounts are threaded openings which can receive the screw.

19. In a device for removing spot weld interconnections of upper and lower flat members of the type including a bit, with a working end and a shank attachable at an opposite end to a rotary drive, and means to control the depth of movement of the working end, the improvement comprising:
- an outer member sleeved over the shank and extending from a proximal end spaced from the shank opposite end to a distal end, the outer member axially movable with respect to the shank between a first position in which the distal end is beyond the working end and a second position in which the working end is beyond the distal end;
- connecting means rotationally and slidably joining the outer member to the shank, the connecting means including a pair of axially spaced annular rotational bearings around and in contact with the shank and having outer portions which are nonrotational with respect to the outer member, at least one of the rotational bearings being a ball bearing, whereby the bit may rotate freely while the outer member is rotationally fixed;
- means biasing the outer member to the first position; and
- means limiting the relative axial movement of the outer member extending radially from the outer member to set the second position, whereby spot weld interconnections can quickly and accurately be removed while preserving the lower member.

* * * * *